Oct. 10, 1950    M. PICKERT    2,525,239
LOAD COMPENSATED AIR BRAKE
Filed Aug. 19, 1948
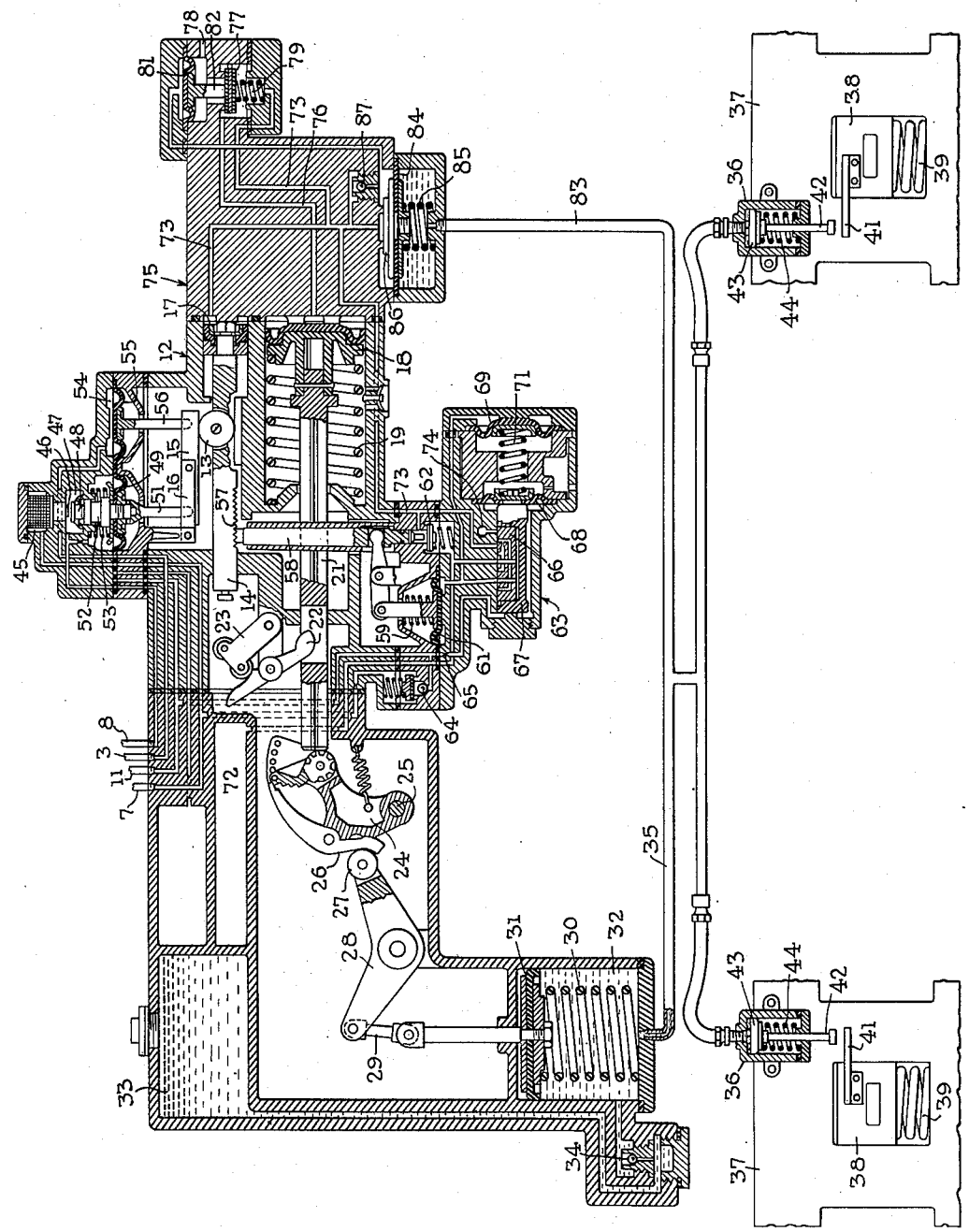
Inventor
Mark Pickert
By
Dodge
Attorneys Patented Oct. 10, 1950

2,525,239

UNITED STATES PATENT OFFICE 2,525,239

LOAD COMPENSATED AIR BRAKE

Mark Pickert, Watertown, N. Y., assignor to The New York Air Brake Company, a corporation of New Jersey Application August 19, 1948, Serial No. 45,031

7 Claims. (Cl. 303—22)

This invention relates to load compensating devices for air brakes and particularly to a load sensing mechanism of novel form adapted to use with the ABLC brake recently adopted as a standard on American railroads.

In designing the ABLC compensating valve an important feature of the design is the arrangement of the mechanism in such a way that if the pneumatic mechanism fails to function properly the valve will assume no-load position, since it is safer to have the brakes set for no-load on a loaded car than to have them set for loaded condition on an empty car.

The method of attaining this desirable characteristic is so to arrange the mechanism that the first event in any load sensing cycle is motion to no-load position. If the mechanism then fails to function the resulting no-load setting persists.

In the presently commercial embodiments of the ABLC brake the load sensing device is strictly mechanical. Since the compensating valve is mounted on the car body, whereas the load sensing means is mounted on the truck, and responds to spring depression under load, the mechanical load sensing device leaves something to be desired.

An attractive proposal is the substitution of a hydraulic load sensing device for the mechanical one now used. It would eliminate a number of moving parts now subject to wear and, as indicated in the patent to Baldwin No. 2,405,632 issued August 13, 1946, would permit the determination of the average of the load at two or more points. For example, the average of the load on two trucks could readily be sensed.

The adoption of hydraulic sensing mechanisms has been resisted by fear that leakage from the system or rupture of the hydraulic lines might result in a load setting on an empty car. The present invention removes this heretofore possible danger by providing a simple safety device, which, in the event of rupture of, or even material leakage from, the hydraulic system, will cause setting of the compensating valve in no-load position. Thus, the use of the hydraulic sensing device is rendered as safe as, or even safer, than present commercial practice.

The ABLC load compensating mechanism is illustrated and described in a publication of The New York Air Brake Company, entitled "C. I. 1217—Load Compensating Brake Equipment for Freight Cars (adjusts braking force to car load), April 1947." Fig. 2 shows the complete equipment for one car.

In the compensating valve there shown, a cut off valve feeds air from the brake pipe at a restricted rate during the first 45 pounds rise of brake pipe pressure and then vents the air so fed. The air so fed performs a series of operations—(1) operates a motor which unlatches the ratio change mechanism, (2) operates a piston which shifts the ratio change mechanism to no-load position, (3) operates an adjusting piston which returns the ratio change mechanism to a load-selected position, (4) vents the latch motor and so locks the ratio change mechanism, and (5) vents pressure from the two pistons so that the load sensing device retreats to inactive position.

In performing the operation numbered (3), above, the adjusting piston moves the ratio change mechanism a distance determined by truck spring depression and varying with such depression. The so-called "weighing gear" is simply a linkage which produces relative movement between a spring borne stop and a stop which is not spring borne, until the stops engage. The extent of movement to cause engagement is proportional to load.

It has been proposed to substitute for the linkage just named a hydraulic motion-transmitter, which would be under pressure only during load sensing.

The present invention affords a safety device which during load sensing, but only if hydraulic pressure fails to develop, keeps the first named piston under pressure and vents pressure otherwise directed against the second named piston, assuring a no-load setting. This setting is locked at the end of the load sensing cycle.

A practical embodiment of the invention will now be described by reference to the accompanying drawing, in which the single figure is a sectional diagram of the compensating valve and related weighing gear constructed according to the invention.

As indicated in C. I. 1217 the load compensating equipment for one car comprises an ABEL brake valve, a three compartment reservoir, a compensating brake cylinder having a large brake-applying working space and a smaller annular working space (called the compensating chamber), a slack adjuster and a retainer, none of which parts is included in applicant's drawing and all of which would be used in the present commercial form connected as shown in Fig. 2 of C. I. 1217. In addition, the equipment includes a compensating valve, which is not changed in any respect from that shown in C. I. 1217, except that the cylinder heads are replaced by a special casting which carries the protection valve mechanism forming the principal novel feature of the present invention.

The weighing gear is operated by the large piston in the compensating valve, just as is the weighing gear in C. I. 1217. The weighing gear is hydraulic rather than mechanical and has a hydraulic connection to the protection valve mechanism, just mentioned as applied to the compensating valve.

The third chamber of the reservoir is provided to furnish air to energize the compensating chamber. The flow of air to the compensating chamber is controlled by the compensating valve. The compensating chamber is an annular working space in the brake cylinder, in which pressure controlled by the compensating valve opposes the braking force developed in the brake cylinder. On a fully loaded car the compensating chamber is not charged at all, so that the brakes apply with full force. Thus the minimum quantity of air is used during applications on a loaded car. On an entirely empty car the compensating chamber is charged during application as fully as the apparatus permits, so that the force of the application is minimized. The maximum air consumption thus occurs during brake applications on empty cars. On cars carrying partial loads the compensating valve charges the compensating chamber to pressures which are fractions of the main brake cylinder pressure inversely proportioned to load.

The foregoing gives the environment in which the invention is used and the general principles on which it is based. The preferred arrangement for carrying it out is constructed as follows:

Since the ABEL valve, the reservoir and the brake cylinder and its compensating chamber are conventional and are not illustrated in the application drawing, it is convenient to apply to the pipe connections which lead to the compensating valve the same numerals which are used on Fig. 2 of C. I. 1217. These are the brake cylinder pipe 3, the compensating reservoir pipe 7, the compensating chamber pipe 8 and the brake pipe 11. The compensating valve as a whole is indicated by the numeral 12. The adjustable element of the compensating valve is the fulcrum roller 13 mounted on a longitudinally movable rod 14. The roller supports a lever 15 at various points in its length. The lever 15 is held against longitudinal motion by a drag link 16 which is pinned to the middle of lever 15 at one end and pinned to a fixed support at the other end as shown.

A piston 17 working in a cylinder clearly shown in the drawing is formed on the right-hand end of the rod 14. In the initial portion of the load sensing cycle the piston 17 is subjected to pneumatic pressure and being forced to the left, when the latch releases, carries the roller 13 to its no-load setting. At the same time the load-sensing device develops pressure on the piston 18 but the response of piston 18 is delayed by the loading spring 19. Piston 18 ultimately reacts through rod 21, rocker 22, and the follower 23 to move rod 14 and roller 13 back to the right to establish a new load-responsive adjustment. This adjustment is determined as follows:

The end of rod 21 reacts on the arm 24, which is pivoted at 25, and which carries a cam surface 26. The cam surface 26 reacts on the roller 27 carried by the bell crank 28. The bell crank 28 is connected by link 29 with the piston rod of piston 31 which works in cylinder 32, and is the primary hydraulic piston. This piston is urged upward by a relatively light spring 30, one not strong enough to develop suction in the hydraulic system until pistons 43, hereinafter described, reach their upper limits of motion. To supply minor leakage and keep the hydraulic system liquid-filled the space in cylinder 32 below piston 31 is fed by gravity from a reservoir 33 through a ball check valve 34. This could occur only if pistons 43 reach their upper limits while piston 31 is below its upper limit. Cylinder 32 below piston 31 is connected by line 35 with two cylinders 36, there being a cylinder 36 on each of the truck frames 37. It will be understood that these truck frames are not spring borne in the example here illustrated.

A truck bolster 38 is supported in each truck frame 37 by load bearing springs, one of which appears for each truck at 39. Fixed to the bolster 38 is a stop member 41. Obviously this stop is positioned lower and lower with reference to the truck frame 37 as the car body is more heavily loaded. The stop 41 is in the path of the end of a piston rod 42 connected to piston 43 in the cylinder 36. Springs 44 rather strongly bias the pistons 43 and rods 42 upward. The equipments on the two trucks are identical.

When the piston 18 moves to the left it turns the bell crank 28 and forces piston 31 downward. The effect is to force both the pistons 43 down. The distance each of the pistons 43 can be moved down is a function of the load on its truck and increases with load. The distance that the piston 31 can move measures the average effect of motion of the two pistons 43 on the two trucks and positively limits the adjusting movement of piston 18. It follows that load is sensed by the hydraulic mechanism here described in fundamentally the same way that load is sensed in Fig. 2 of C. I. 1217. However, the connections from the car body to the truck are simple flexible tubes instead of links and levers which are heavy and are subjected to wear under vibration as the car runs.

The compensating reservoir line 7 leads to an air supply chamber 45 of a relay valve. Beneath chamber 45 is the poppet inlet valve 46. Beneath the inlet valve 46 is the compensating valve chamber 47 with which the pipe 8 connects. This is the pipe leading to the compensating chamber of the brake cylinder. Controlling exhaust from the chamber 47 is the exhaust valve 48. A diaphragm 49 carries the stem 51 which engages the left end of variable ratio lever 15. The seat for the exhaust valve 48 is carried in the central diaphragm clamping member 52 attached to the upper end of stem 51. The usual loading spring appears at 53. Brake cylinder pressure conducted through pipe 3 reacts in chamber 54 on diaphragm 55 and through stem 56 connected with the center of the diaphragm, on the right-hand end of variable ratio lever 15.

From the construction above described it follows that for every pressure developed in chamber 54 a proportional pressure will be created by the relay valve in chamber 47. The proportioning ratio is variable and depends on the adjusted position of fulcrum roller 13.

The rod 14 is toothed as indicated at 57 and is there normally engaged and fixed in position by a latch 58. The latch is biased to engage by spring 59 and is capable of being disengaged when diaphragm 61 is forced up by pressure developed beneath it during the load sensing cycle. The lower end of the stem of latch 58 functions, when the latch is disengaged, to unseat a spring loaded check valve 62.

The brake pipe connection 11 leads to the cut-off valve generally indicated by the numeral 63. It has a branch which leads through a charging check valve 64 to the connection 7 and consequently to the third chamber of the three compartment reservoir. This is the chamber which supplies air to the relay valve and through this valve to the compensating chamber. Immediately beyond the connection to the charging valve 64 is a choke 65 which is provided to resist pressure surges in the brake pipe and prevent their interfering with the operation of the cut-off valve and its related parts. The cut-off valve comprises a slide valve 66 confined in a notch in the stem 67. Stem 67 is connected to a motor diaphragm 68. Spaced from diaphragm 68 is a second diaphragm 69 of unequal area and reacting between the two diaphragms is a coil compression loading spring 71. The space between the diaphragms is vented to atmosphere.

The slide valve 66 has two through ports which register with seat ports when the stem 67 is in its extreme left-hand position as shown in Fig. 1. One of these ports leads directly to the space below diaphragm 61 and the other leads directly to the space below check valve 62 and also to a volume reservoir 72.

The seat of the valve has a third port 73 connected with the space to the right of piston 17 and to the space above the valve 62. There is also an exhaust port 74 in the seat of the slide valve 66. The port 73 has important additional connections which are parts of the protection valve mechanism and will hereinafter be described.

Slide valve 66 has two loop ports both of which are blanked in the illustrated position of the valve but function when the valve is moved to the right to the limit of its motion. One of these loop ports then connects the space below diaphragm 61 freely to exhaust port 74, assuring rapid re-engagement of the latch. The other loop port is formed with a restricted communication with the first loop port and in the limiting right-hand position of valve 66 it connects the space below the valve 62 and also the port 73 through this restriction to exhaust port 74.

A special head 75 replaces the head heretofore used at the ends of the cylinder for pistons 17 and 18. In this head are extensions of port 73 and a port 76 which leads to the space at the right of piston 18. A double seated protection valve 77 is biased by spring 79 to a normal position in which it connects ports 73 and 76 and closes exhaust port 78. Valve 77 may be forced by diaphragm 81 with thrust stem 82 to a protection position in which it disconnects port 76 from port 73 and connects port 76 to exhaust port 78 venting pressure from piston 18 so that a no-load setting is all that can be made. This last (protection) position is assumed only when hydraulic pressure fails to develop in hydraulic line 35 during a load sensing cycle.

The pressure above diaphragm 81 is controlled to effect the desired result as follows: A branch line 83 leads from tube 35 to a chamber below diaphragm 84 and assists spring 85 in seating valve 86. Valve 86 when open permits air to flow from port 73 to the space above diaphragm 81. A release check valve 87 permits releasing flow in the reverse direction at any time that port 73 may be vented. Spring 85 is of such strength that as pressure rises in port 73 during the load sensing cycle valve 86 will be forced open unless hydraulic pressure is developed beneath diaphragm 84. Hydraulic pressure cannot be developed beneath diaphragm 84 unless the hydraulic system is intact.

*Operation*

Under running conditions in the brake system the compensating volume reservoir will have been charged. It is immaterial whether the auxiliary reservoir and the emergency reservoir are charged or have been bled. In any case the load sensing cycle starts with the brake pipe at atmospheric pressure, this being the condition after an emergency application or the condition on a car that has been cut out of a train and bled.

Assume now that pressure starts to rise in brake pipe 11, the slide valve 66 will be in the left-hand position shown in the drawing and the first effect of pressure development in the valve chamber is flow to the space below diaphragm 61 which will retract the latch 58 and free the rod 14. Upon release of the latch, the valve 62 will be unseated and air will flow from the slide valve chamber through the slide valve 66 past valve 62 to port 73. Since port 73 leads freely to the space to the right of piston 17, the fulcrum 13 will be moved a full stroke to the left, i. e. to no-load position. Observe that the choke 65 delays the rise of pressure beyond the choke and prevents any surges of pressure which may exist in the brake pipe 11 from deranging the action of cut-off valve 63.

The admission of air below the diaphragm 61 entails simultaneous admission of air to the space to the right of diaphragm 69 so that the spring 71 is rather heavily stressed and resists motion of the valve 66 from the left-hand position illustrated. Since the spring 79 holds the valve 77 against the exhaust seat the first effect is to admit pressure from port 73 to port 76 and consequently to the space at the right of piston 18. When this pressure rises sufficiently to overpower the spring 19, the rod 21 moves to the left and this motion will continue until the displacement of piston 31 has caused displacement of the pistons 43 to the point at which their arrest occurs through the collision of piston rods 42 with stops 41. During displacement of piston 31 and after arrest of the pistons 36 a substantial hydraulic pressure is developed in the line 35.

If it is developed, a sufficient pressure exists below diaphragm 84 to hold the valve 86 closed. In such event the valve 77 remains in its upward position as shown in the drawing until the end of the load sensing cycle.

We have assumed that the cycle will end at the chosen value of 45 p. s. i. in the slide valve chamber of valve 66. At this pressure diaphragm 68 will have moved the valve 66 to the right far enough to connect the space below diaphragm 61 with exhaust port 74. The effect is immediate engagement of latch 58 and immediate venting of the space to the right of diaphragm 69. As a consequence of the latter event the valve 66 moves fully to its right-hand position. The effect of this is slow venting of chamber 72 and port 73 so that pressures existing to the right of pistons 17 and 18 are gradually dissipated. The rod 14 remains locked in its adjusted position but the piston 18 retreats under the action of spring 19, the spring 30 and the springs 44. As a consequence the pistons 43 move to their uppermost positions beyond the path of stops 41. This terminates the normal function of the device.

Suppose, however, that during the load sensing cycle hydraulic pressure fails to develop in the line 35. This could happen as a result of serious leakage from the hydraulic system. It might even be caused by rupture of line 35. Whatever the cause, if hydraulic pressure fails to develop below the diaphragm 84, the valve 86 will be forced open by rising pressure in the port 73. This is because the spring 85 is comparatively weak. Spring 85 will hold valve 86 closed against the pressure developing initially in port 73 but will not hold it closed as this pressure rises unless the spring receives assistance by hydraulic pressure communicated through connection 83. After the valve 86 opens the pressure in port 73 becomes effective above the diaphragm 81. As a consequence the valve 77 is forced to its lower seat and port 76 is disconnected from port 73 and vented to atmosphere. Upon the occurrence of this venting action piston 18 moves to the right under the urge of spring 19. Since port 73 is still under pressure the piston 17 will then move a full stroke to the left and establish a no-load setting which will be maintained by re-engagement of latch 58 at the end of the load sensing cycle. Thus, the protection valve mechanism mounted in head 75 allows the normal load sensing operation to occur if the hydraulic system functions properly. However, if hydraulic pressure fails to develop in the load sensing system, it conditions the apparatus to establish no-load conditions.

While one protection valve mechanism has been described in detail, functionally similar devices of specifically different form could be developed and this fact is fully recognized. The invention has the advantage that except for the substitution of the special head 75 no change in the compensating valve mechanism is required. Of course, the bell crank 28 and the hydraulic motion transmitting system used as a weighing gear differs from the mechanical weighing gear disclosed in C. I. 1217 but the compensating valve proper is not changed in any detail and practically all parts of it would be interchangeable. The invention thus provides a safe hydraulic sensing means which can be used with existing compensating valve installations.

I claim:

1. In a load compensating air brake, the combination of a compensating valve adjustable through a range of settings to modify the intensity of brake applications between no-load and full-load intensities; adjustable stop means for limiting the adjusting motion of said compensating valve; load-sensing means; fluid pressure operated setting means for positioning said stop means in accordance with the indications of said load-sensing means; normally inactive pressure-operated adjusting means for said compensating valve, said adjusting means being capable of two diverse functions, a normal function in which it adjusts the compensating valve to the setting determined by said stop means, and a safety function in which it adjusts said compensating means to no-load position; a protection device arranged to exercise supervisory control on said adjusting means, and serving in response to the development of pressure in said setting means to condition the adjusting means to perform said normal function, but serving in the absence of pressure in said setting means to condition said adjusting means to perform said safety function; and means operable to render said adjusting means active.

2. The combination defined in claim 1 in which the fluid-pressure operated setting means comprises a confined column of liquid.

3. In a load compensating air brake the combination of a compensating valve adjustable through a range of settings to modify the intensity of brake applications between no-load and full-load intensities; means serving to bias said compensating valve toward no-load setting, at least while load is being sensed; means for sensing load; a pneumatically actuated adjusting piston connected to adjust said compensating valve in opposition to said bias; a hydraulic motion transmitter interposed between said adjusting piston and said load sensing means, whereby the piston is arrested by hydraulic liquid under pressure at a point determined by the sensing means; and means responsive to a deficiency of pressure in said hydraulic transmitter during the load sensing function and serving to vent motive pressure from said adjusting piston while said biasing means is active.

4. In a load compensating air brake, the combination of a brake pipe; a compensating valve for modifying the intensity of brake applications and adjustable through a progressive series of load positions to control brake applications between no-load and full-load intensities; a cut-off valve supplied with air under pressure by the brake pipe and adapted to perform a load sensing cycle during charging of the brake pipe; two pistons operable by pneumatic pressure controlled by said cut-off valve during said cycle, namely a biasing piston serving to urge the compensating valve to no-load position, and an adjusting piston capable of overpowering the biasing piston and moving the compensating valve against said bias toward full-load position; locking means for the adjustable element of the compensating valve and so controlled by the cut-off valve as to release at the start of said cycle and re-engage at the end thereof; a weighing gear whose motion is limited to a variable extent proportioned to load, and whose extent of motion determines the extent of motion of said adjusting piston; a normally inactive protection valve effective, when operated, to vent pressure fluid from the adjusting piston while isolating said piston from said cut-off valve; and means responsive to failure of the weighing gear to develop its normal force reaction, for causing operation of said protection valve.

5. The combination defined in claim 4 in which the weighing gear comprises a confined column of liquid which is put under pressure during the load sensing cycle; and the protection valve responds to deficiency of said pressure.

6. In a load compensating air brake, the combination of a compensating valve adjustable through a range of settings to modify the intensity of brake applications between no-load and full-load intensities; normally inactive adjusting means adapted when rendered active to react on the adjusting mechanism of said valve in two successive phases, a first phase in which it sets the valve for no-load intensity and a second phase in which it sets the valve for a higher intensity; load-sensing means; a motion transmitting connection between the load-sensing means and said adjusting means, comprising conduit-forming means, a liquid confined thereby and means whereby the adjusting means when rendered active develops pressure on said liquid; a protection device responsive to pressure in said conduit and conditioned in the absence of pressure therein to limit the action of said adjusting means to said first phase; and means operable to render said adjusting means active.

7. In a load compensating air brake, the combination of a variable-ratio relay valve adjustable through a range of ratio settings to modify the intensity of brake applications between no-load and full-load intensities; normally inert fluid pressure activated load-sensing means including an adjustable stop for limiting adjusting motion of the relay toward full-load position and a hydraulic line for setting said stop according to load; normally inactive pneumatic differential motor means arranged to adjust said relay and including a relatively small working space which affords a servient bias toward no-load position, and a larger working space which affords a dominant bias toward full-load position, said motor means when active serving to develop pressure in said hydraulic line and set said stop; a protection device rendered active by failure of pressure to develop in said hydraulic line during the operation of said differential motor means and then serving to vent said larger working space; and means operable to render said motor means active.

MARK PICKERT.

REFERENCES CITED

The following references are of record in the file of this patent:

UNITED STATES PATENTS

| Number | Name | Date |
|---|---|---|
| 2,374,036 | Oliver | Apr. 17, 1945 |
| 2,405,632 | Baldwin | Aug. 13, 1946 |
| 2,447,857 | Hewitt | Aug. 24, 1948 |